United States Patent
Roesler et al.

(10) Patent No.: US 6,894,138 B1
(45) Date of Patent: May 17, 2005

(54) BLOCKED POLYISOCYANATE

(75) Inventors: Richard R. Roesler, Wexford, PA (US); Patricia B. Jacobs, Pittsburgh, PA (US); Dinesh Pethiyagoda, Pittsburgh, PA (US); Tabitha H. Riggio, Murrysville, PA (US); Marianne M. Salek, Oakdale, PA (US); Emery Yuhas, McDonald, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 10/723,489

(22) Filed: Nov. 26, 2003

(51) Int. Cl.$^7$ .............................................. C08G 18/80
(52) U.S. Cl. ................. 528/45; 252/182.22; 548/374.1
(58) Field of Search ..................... 528/45; 252/182.22; 548/374.1

(56) References Cited

U.S. PATENT DOCUMENTS

| | | | |
|---|---|---|---|
| 4,314,048 A | 2/1982 | Doi et al. | 528/44 |
| 4,976,837 A | 12/1990 | Hughes et al. | 204/181.7 |
| 5,246,557 A | 9/1993 | Hughes et al. | 204/181.4 |
| 5,521,272 A | 5/1996 | O'Connor et al. | 528/45 |
| 5,714,564 A | 2/1998 | Shaffer | 528/67 |
| 5,854,301 A | 12/1998 | Dvorchak et al. | 522/90 |
| 5,986,033 A | 11/1999 | Hughes et al. | 528/45 |
| 6,084,051 A | 7/2000 | Blum et al. | 528/71 |
| 6,090,939 A | 7/2000 | Richter et al. | 544/67 |
| 6,100,326 A | 8/2000 | Richter et al. | 524/591 |
| 6,291,578 B1 | 9/2001 | Rosthauser et al. | 524/590 |
| 6,399,691 B1 | 6/2002 | Melchiors et al. | 524/457 |
| 6,432,485 B1 | 8/2002 | Beyers et al. | 427/407.1 |
| 6,433,072 B1 | 8/2002 | Göbel et al. | 524/591 |
| 6,531,535 B2 | 3/2003 | Melchiors et al. | 524/457 |
| 6,566,444 B1 | 5/2003 | Göbel et al. | 524/589 |
| 6,605,669 B2 | 8/2003 | Awokola et al. | 525/123 |

OTHER PUBLICATIONS

Higginbottom et al.; "Coating Systems Based on Tricarbamate Crosslinkers Derived from Triaminononane"; Progress in Organic Coatings; 1998; 34 (1–4), 27–38.*

* cited by examiner

*Primary Examiner*—Rachel Gorr
(74) *Attorney, Agent, or Firm*—Joseph C. Gil

(57) ABSTRACT

The present invention is directed to a blocked polyisocyanate based on nonane triisocyanate. More particularly, the invention is directed to a blocked polyisocyanate useful in solvent borne coating compositions and comprising the reaction product of: a) nonane triisocyanate; b) a pyrazole blocking agent; and c) a diol or polyol.

5 Claims, No Drawings

US 6,894,138 B1

BLOCKED POLYISOCYANATE

BACKGROUND OF THE INVENTION

Nonane triisocyanate (NTI or 4-isocyanatomethyl-1,8-octane diisocyanate) is a known material. Various uses for NTI have been suggested. See, e.g., U.S. Pat. Nos. 4,314,048; 5,714,564; 5,854,301; 6,084,051; 6,090,939; 6,100,326; 6,291,578; 6,399,691; 6,432,485; 6,433,072; 6,531,535; 6,566,444; and 6,605,669.

A market need exists for a high functionally, high NCO content, low unblocking temperature polyurethane crosslinker. Pyrazole-blocked isocyanates unblock at relatively low temperatures (see, e.g., U.S. Pat. Nos. 4,976,837, 5,246,557, 5,521,272 and 5,986,033). The fully blocked reaction product of nonane triisocyanate and a pyrazole meets the market need as far as functionality, NCO content and unblocking temperature but is not soluble in commercially used coating solvents (see U.S. application Ser. No. 10/723,646, filed on the same day as the present application) and as a result has limited usefulness in the coating area.

DESCRIPTION OF THE INVENTION

The present invention is directed to a blocked polyisocyanate based on nonane triisocyanate. More particularly, the invention is directed to a blocked polyisocyanate useful in solvent borne coating compositions and comprising the reaction product of:

a) nonane triisocyanate;
b) a pyrazole blocking agent; and
c) a diol or polyol having a number average molecular weight of from about 62 to about 600 and preferably from about 62 to about 200, wherein i) the isocyanate to hydroxy equivalent ratio of component a) to component c) is from 1:0.15 to 1:0.6 and ii) the equivalent ratio of isocyanate groups to blocking groups is from 1:0.4 to 1:0.85. The invention provides a composition useful in commonly used urethane grade solvents.

The pyrazole blocking agents are known and are disclosed, e.g., in U.S. Pat. Nos. 4,976,837, 5,246,557, 5,421,272 and 5,986,033, the disclosures of which are hereby incorporated by reference. The preferred pyrazole blocking agents are selected from the group consisting of 3,5-dimethylpyrazole, 4-nitro-3,5-dimethylpyrazole, 4-benzyl-3,5-dimethylpyrazole, methyl-5-methylpyrazole-3-carboxylate, pyrazole, 3-methyl-5-phenylpyrazole, 3-methylpyrazole, 4-bromo-3,5-dimethylpyrazole and 3,5-dimethylpyrazole-4-carboxanilide, with 3,5-dimethylpyrazole being most preferred.

As used herein, "NTI" is intended to mean nonane triisocyanate. As is clear from the art, in addition to being called nonane triisocyanate (U.S. Pat. No. 6,084,051), nonane triisocyanate has been called i) 4-isocyanate methyl-1,8-octamethylene diisocyanate (U.S. Pat. No. 4,314,048), ii) 4-isocyantomethyl-1,8-octamethylene diisocyanate, (U.S. Pat. No. 5,714,564), iii) 4-isocyanatomethyl-1,8-octane diisocyanate (U.S. Pat. No. 6,090,939), iv) triisocyanatononane and TIN (U.S. Pat. No. 6,090,939), and v) 4-isocyanatomethyloctane-1,8-diisocyanate (U.S. Pat. No. 6,100,326).

The diols and polyols useful herein have number average molecular weights of from about 62 to about 600 and preferably from about 62 to about 200. Specifically useful diol and polyols include ethylene glycol; diethylene glycol; triethylene glycol; propylene glycol; dipropylene glycol; butane diols; hexane diols; glycerin; trimethylolethane; trimethylolpropane; pentaerythritol; hexane triols; mannitol; sorbitol; glucose; fructose; mannose; sucrose; and propoxylated and/or ethoxylated adducts of any of the above-noted hydroxy functional materials having number average molecular weights of up to about 600.

The three components can be reacted in any order. For example, in the presently preferred method, the NTI and the diol or polyol are first reacted and the pyrazole is reacted with the resultant product. Alternatively, the pyrazole could first be reacted with the NTI and the diol or polyol could be reacted with the resultant product in a less preferred embodiment, the components could be reacted all at once. Regardless of the method chosen, the amounts of reactants are such that i) the isocyanate to hydroxy equivalent ratio of component a) (the NTI) to component c) (the diol or polyol) is from 1:0.15 to 1:0.6, preferably from 1:0.15 to 1:0.25 and ii) the equivalent ratio of isocyanate groups to blocking groups is from 1:0.4 to 1:0.85, preferably from 1:0.75 to 1:0.85.

Reaction times will depend on the reaction temperatures and the % solids during reaction, but are typically between one and eight hours. Reaction temperatures can be from 50° C. to 120° C., with temperatures of between 60° and 80° C. being preferred to give reasonable reaction times with low color. The solids content is typically between 50 and 90%. Higher solids are preferred, but viscosities can be too high for practical use. Typical non-hydroxyl urethane grade solvents can be used and include ketones, esters, aromatic hydrocarbons and even aliphatic hydrocarbons in combination with one of the previous solvents.

The invention is further illustrated by the following examples in which all parts and percentages are by weight unless otherwise indicated.

EXAMPLES

In the examples, the NTI used was a commercially available NTI having an isocyanate equivalent weight as determined by NCO end group titration of 87 (in theory, the pure NTI would have an equivalent weight of 84).

Example 1

A 500 ml round bottom flask fitted with stirrer, nitrogen inlet, condenser and thermocouple was filled with 86.53 grams (1.0 equivalent) of NTI and 9.18 grams (0.2 equivalent) of 1,3-butanediol. The reaction mixture was heated with stirring to 85° C. and held for two hours at which time the NCO content was 35.20% by weight (theoretical 35.11%). The reaction mixture was cooled to room temperature and 31.85 g methyl propyl ketone and 77.04 grams (0.8 equivalent) of 3,5-dimethylpyrazole was added. The reaction mixture had a strong exotherm and an ice bath was used to keep the temperature to no higher than 65° C. When the exotherm was complete, heat was applied to maintain a reaction temperature of 60° C. The 60° C. reaction temperature was maintained for four hours when an IR spectrum showed no isocyanate remaining. The solids were 85% and the viscosity was >100,000 cps @ 25° C. The isocyanate content of the solution was 256 g/eq. No crystals formed after one month, even after seeding with pure DMP blocked NTI from Comparison Example 1.

Example 2

The procedure of Example 1 was used except that 87.37 grams (1.0 equivalent) of NTI, 14.97 grams (0.33 equivalent) of 1,3-butanediol, 30.21 grams of methyl propyl ketone and 64.57 grams (0.67 equivalent) of 3,5- dimethylpyrazole were used. The isocyanate content of the adduct was 27.8% by weight (theoretical 27.5%). The final product had a solids content of 85% and the viscosity was >100,000 cps @ 25° C. The isocyanate content of the solution was 294 g/eq. No crystals formed after one month, even after seeding with pure DMP blocked NTI from Comparison Example 1.

Comparison Example 1

A one liter round bottom flask fitted with stirrer, nitrogen inlet, condenser and thermocouple was filled with 203.9 grams (2.361 equivalents) of NTI and 75.0 grams of methyl propyl ketone. The reaction mixture was heated with stirring to 50° C. and 231.2 grams (2.409 equivalents) of 3,5-dimethylpyrazole was added slowly. The reaction mixture had a strong exotherm and an ice bath was used to keep the temperature to no higher than 55° C. When the exotherm was complete, heat was applied to maintain a reaction temperature of 50° C. The 50° C. reaction temperature was maintained for two hours when an IR spectrum showed no isocyanate remaining. The solids were 85% and the viscosity was 3,500 cps @ 25° C. The isocyanate content of the solution was 216 g/eq. Crystals formed spontaneously in less than one week.

Comparison Example 2

The procedure of Example 1 was used except that 86.60 grams (1.0 equivalent) of NTI, 4.66 grams (0.1 equivalent) of 1,3-butanediol, 31.32 grams of methyl propyl ketone and 87.4 grams (0.9 equivalent) of 3,5-dimethyl pyrazole were used. The isocyanate content of the adduct was 40.85% (theoretical 41.59%). The final product had a solids content of 85% and the viscosity was 2,300 cps @ 25° C. The isocyanate content of the solution was 210 g/eq. Crystals formed spontaneously after one week.

Example 3

A paint formulation was prepared from 39 grams of the blocked isocyanate of Example 1, 100 grams of Desmophen A870 BA, 0.2 grams of Byk 306, 0.2 grams of Byk 358 and 34.7 grams of a mixture of n-butanol:propylmethyl ether acetate:3-ethoxypropanoic acid ethyl ester (4:5:6 weight ratio). When the DMP adduct of NTI 2 was used, the formulation was adjusted for the NCO content.

Desmophen A870 BA is an acrylic polyol at 70% solids in butyl acetate, having an OH number of 97 and a viscosity at 23° C. of 3500 cps, available from Bayer Polymers LLC. Byk 306 is a silicone surfactant, available from Byk Chemie. Byk 358 is an acrylic leveling additive, available from Byk Chemie.

The clear coating was drawn down with a 3 mil draw down bar on an e-coated steel panel and cured at 285° C. for 30 minutes.

The results are given in the following table.

| Test | DMP adduct of NTI prepolymer1 | DMP adduct of NTI prepolymer2 |
|---|---|---|
| Equivalent weight, g/eq | 294 | 216 |
| MEK double rubs | Pass 100 | Pass 100 |

-continued

| Test | DMP adduct of NTI prepolymer1 | DMP adduct of NTI prepolymer2 |
|---|---|---|
| Adhesion | Pass | Pass |
| Pendulum hardness, sec | 178 | 178 |

The "MEK double rubs" was conducted as follows:

1. The ball of a 2 pound ball peen hammer is securely wrapped with several layers of cloth (8"×8"cloth folded twice) and secured by using a rubber band.
2. The cloth is saturated with methyl ethyl ketone (MEK).
3. The wet ball peen is laid on the coating surface, so that the ball peen is at a 90-degree angle to the surface. Without applying downward pressure, the hammer is pushed back and forth over an approximately 4" long area of the coating. One forward and back motion is counted as 1 double rub.
4. The cloth is resaturated with MEK after every 25 double rubs.

The adhesion was measured using ASTM D3359-95 Standard Test Method for Measuring Adhesion by Tape.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A blocked polyisocyanate comprising the reaction product of:

a) nonane triisocyanate;

b) a pyrazole blocking agent; and c) a diol or polyol having a number average molecular weight of from about 62 to about 600 and wherein i) the isocyanate to hydroxy equivalent ratio of component a) to component c) is from 1:0.15 to 1:0.6 and ii) the equivalent ratio of isocyanate groups to blocking groups is from 1:0.4 to 1:0.85.

2. The blocked polyisocyanate of claim 1, wherein the number average molecular weight of component c) is from about 62 to about 200.

3. The blocked polyisocyanate of claim 1, wherein i) the isocyanate to hydroxy equivalent ratio of component a) to component c) is from 1:0.15 to 1:0.25 and ii) the equivalent ratio of isocyanate groups to blocking groups is from 1:0.75 to 1:0.85.

4. The blocked polyisocyanate of claim 1, wherein said pyrazole blocking agent is selected from the group consisting of 3,5-dimethylpyrazole, 4-nitro-3,5-dimethylpyrazole, 4-benzyl-3,5-dimethypyrazole, methyl-5-methylpyrazole-3-carboxylate, pyrazole, 3-methyl-5-phenylpyrazole, 3-methylpyrazole, 4-bromo-3,5-dimethylpyrazole and 3,5-dimethylpyrazole-4-carboxanilide.

5. The blocked polyisocyanate of claim 1, wherein said pyrazole blocking agent is 3,5-dimethylpyrazole.

* * * * *